United States Patent [19]

Fiorenza, II

[11] Patent Number: 5,383,433
[45] Date of Patent: Jan. 24, 1995

[54] MICROPROCESSOR-CONTROLLED INDUCTIVE IGNITION SYSTEM

[75] Inventor: John A. Fiorenza, II, Slinger

[73] Assignee: Briggs & Stratton Corporation, Wauwatosa, Wis.

[21] Appl. No.: 64,498

[22] Filed: May 19, 1993

[51] Int. Cl.⁶ .............................................. F02P 5/00
[52] U.S. Cl. ..................................... 123/416; 123/424
[58] Field of Search ............... 123/416, 424, 647, 418, 123/421, 602, 640; 307/234; 328/120

[56] References Cited

U.S. PATENT DOCUMENTS

| | | | |
|---|---|---|---|
| 3,453,738 | 12/1970 | Barber et al. | 123/418 |
| 3,901,201 | 8/1975 | Mizuguchi et al. | 123/424 |
| 4,022,170 | 5/1977 | Crall et al. | 123/415 |
| 4,270,509 | 6/1981 | Tharman | 123/647 |
| 4,378,770 | 4/1983 | Ikeura | 123/424 |
| 4,442,813 | 4/1984 | Nagase et al. | 123/418 |
| 4,493,307 | 1/1985 | Trinh et al. | 123/630 |
| 4,611,569 | 9/1986 | Kondo et al. | 123/600 |
| 4,633,834 | 1/1987 | Takeuchi et al. | 123/424 |
| 4,924,831 | 5/1990 | Piteo et al. | 123/417 |
| 4,932,376 | 6/1990 | Linder et al. | 123/422 |
| 4,982,712 | 1/1991 | Abe | 123/424 |
| 5,050,553 | 9/1991 | Erhard | 123/424 |
| 5,099,811 | 3/1992 | Frantz et al. | 123/416 |
| 5,297,048 | 3/1994 | Gauer | 123/416 |

*Primary Examiner*—Raymond A. Nelli
*Attorney, Agent, or Firm*—Andrus, Sceales, Starke & Sawall

[57] ABSTRACT

A microprocessor-controlled inductive ignition system uses a magneto inductive ignition circuit at engine starting speeds, and a microprocessor-controlled ignition circuit at engine running speeds. The microprocessor senses the ignition firings, computes the time between successive ignition firings, and disables the magneto inductive ignition system when the engine speed is greater than a predetermined cut-off speed. The ignition system enables an engine with a recoil starter to be started if the battery is low or if an alternator is used to power the microprocessor. At engine running speeds, the ignition system achieves a greater amount of timing advance than achievable with an inductive ignition system alone, thereby increasing engine efficiency.

16 Claims, 5 Drawing Sheets (a) LINE 34

(b) LINE 40

(c) LINE 54

(d) LINE 44

MICROPROCESSOR-CONTROLLED INDUCTIVE IGNITION SYSTEM

BACKGROUND OF THE INVENTION

This invention relates to ignition systems for small internal combustion engines like those used on lawnmowers, snowblowers and the like. More particularly, this invention relates to inductive and microprocessor-controlled ignition systems for such engines.

Magneto inductive ignition systems are known that enable internal combustion engines to be started and run without the need for a separate power supply, such as a battery or an alternator. However, typical prior art inductive ignition systems have poor starting characteristics because the ignition timing is very advanced at engine starting speeds to enable the engine to run efficiently at running speeds. For example, the ignition timing may occur at about 36 degrees Before Top Dead Center (BTDC) at engine starting speeds of about 200 revolutions per minute (rpm). The ignition timing retards a fixed amount as the engine speed increases to an engine running speed, with the maximum advance being between about 5 to 9 degrees.

Magneto inductive ignition systems are often used on engines having recoil starters. One way to improve the starting characteristics and to minimize kick-back of the recoil starter is to physically move the inductive system by 5 degrees in the Before Top Dead Center direction. Although this placement of the inductive ignition system improves starting characteristics, it also results in an undesirable loss of horsepower due to poor timing at engine running speeds, which are typically about 3,000 to 3,600 rpm.

Electronic and microprocessor-controlled ignition systems are also known for small internal combustion engines. One advantage of a microprocessor-controlled ignition system is that ignition timing advance is not fixed as in a discrete component, electronic inductive system; the ignition timing may be advanced by any desired amount as a function of the engine's speed. A major disadvantage of microprocessor-controlled systems, however, is that they typically require a direct current power source to operate the microprocessor. The power source is usually a battery. If the battery is not fully charged, a microprocessor-based system may be unable to start the engine since the battery may not provide sufficient power to drive the microprocessor.

SUMMARY OF THE PRESENT INVENTION

A microprocessor-controlled inductive ignition system is disclosed which combines the best features of an inductive ignition circuit with the best features of a microprocessor-controlled ignition circuit to improve the startability and the efficiency of an internal combustion engine.

In a preferred embodiment of the present invention, the ignition system includes a primary winding, a secondary winding in magnetic flux communication with the primary winding and interconnected with an ignition device such as a spark plug, an inductive ignition circuit for operating the engine below a predetermined cut-off speed such as 1,000 rpm, and a processor-controlled ignition circuit for operating the engine above the predetermined speed.

The inductive ignition circuit includes: a first means for generating a changing magnetic field such as a rotatable magnet and a trigger coil, said first means generating a first switch control signal in response to the changing magnetic field; and a first switch means interconnected with the primary winding for switching the primary winding on or off in response to the first switch control signal. The first switch means is preferably a Darlington transistor pair.

The processor-controlled ignition circuit preferably includes a means for sensing a first event functionally related to a first turn-off time of the primary winding, and a means for sensing a second event functionally related to a second turn-off time of the primary winding. For example, the first and second events may be successive switch control signals from the trigger coil.

The processor-controlled ignition circuit also includes a means for determining the elapsed time between the first event and the second event, and a means for comparing the elapsed time with a predetermined time, stored in memory, that is functionally related to a predetermined cut-off speed. When the comparison indicates that the elapsed time is less than the predetermined time, a causing means generates a second switch control signal to a second switch means to cause the primary winding to be turned on. After a preset dwell time, the causing means thereafter generates a third switch control signal to cause the primary winding to be turned off.

The preferred embodiment also includes a means for preventing the primary winding from being turned on or off in response to the first switch control signal when the processor is controlling the ignition timing; that is, when the elapsed time is less than the predetermined time. The preventing means preferably includes a silicon controlled rectifier (SCR) that is gated on by the processor when the elapsed time is less than the predetermined time.

Also in a preferred embodiment, the processor-controlled ignition circuit includes a means for storing a plurality of desired ignition advance values that are functionally related to the magnitude of the elapsed time, and a means for changing the point at which the causing means causes the primary winding to be turned on as a function of the stored, desired advance value.

In the preferred embodiment, the determining means, the comparing means, the causing means, and the storing means all include a microprocessor. A voltage source such as a battery is provided to power the microprocessor and to provide power to the primary winding when the primary winding is turned on in a response to the microprocessor.

In operation, the inductive ignition circuit starts the engine and controls ignition timing until the engine reaches a predetermined speed such as 1,000 rpm, corresponding to the predetermined time. The microprocessor continuously senses the ignition firings and calculates the engine speed. When the engine speed is above the predetermined speed, the microprocessor grounds the trigger winding through the SCR, and generates control signals that control ignition timing. The point at which the control signals are generated is dependent upon optimal ignition advance values stored in the microprocessor memory.

In a preferred embodiment of the present invention, the inductive and the processor-controlled ignition circuits are separately powered by two distinct power sources. In the preferred embodiment, the inductive ignition circuit is of the magneto-type, so that no battery is required to start the engine. The power source for the magneto inductive ignition circuit would include a magnet that passes either the primary winding or a trigger winding. However, a battery may be used to power other types of inductive ignition circuits.

The processor-controlled ignition circuit is preferably powered by either a battery or by the engine alternator.

It is a feature and advantage of the present invention to provide an ignition system having both an inductive circuit and a processor-controlled ignition circuit.

It is another feature and advantage of the present invention to provide a processor-controlled ignition system that starts the engine when the battery output is low.

It is yet another feature and advantage of the present invention to provide an ignition system with increased startability and increased operating characteristics at engine running speed.

It is another feature and advantage of the present invention to provide a microprocessor-controlled ignition system that does not require a battery to start the engine.

These and other features and advantages of the present invention will be apparent to those skilled in the art from the following detailed description of the preferred embodiments and the attached drawings, in which:

DESCRIPTION OF THE PREFERRED EMBODIMENTS

Figure 1A:
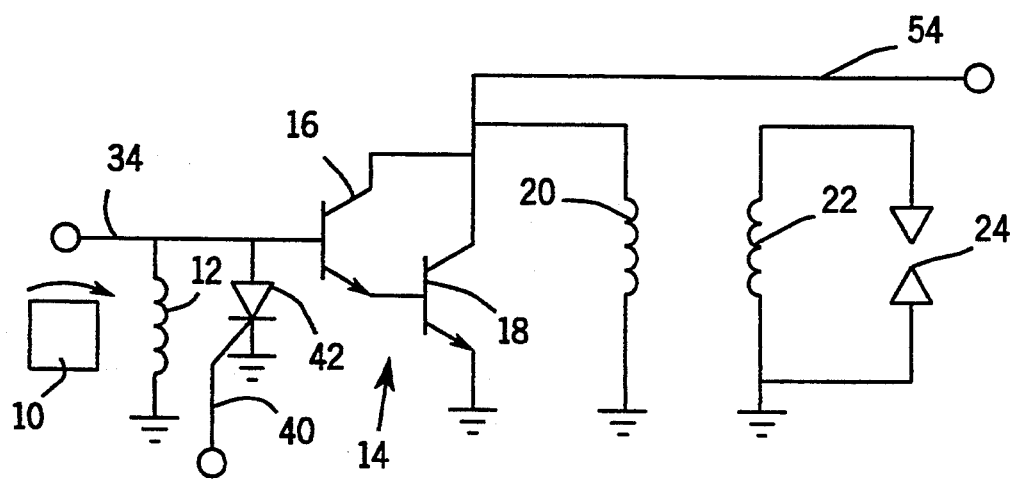
FIGS. 1(a) and 1(b) comprise a schematic diagram of a preferred embodiment of the present invention.
Figure 1B:
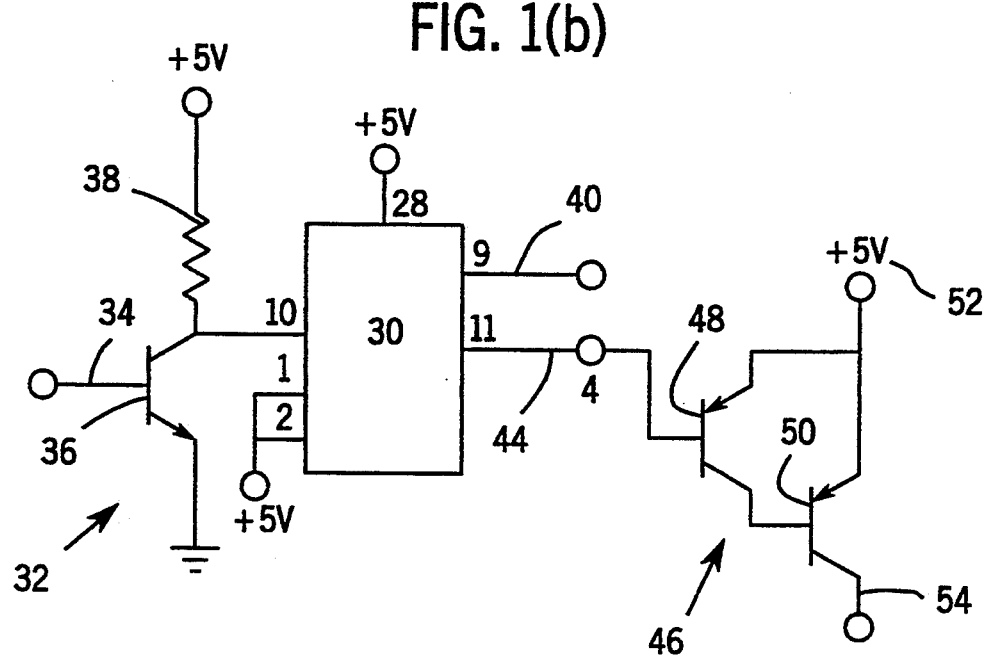

FIGS. 1(a) through 1(b) depict the preferred embodiment of the present invention. In FIGS. 1(a) and 1(b), an inductive ignition circuit includes a rotating magnet 10, a trigger coil 12 in magnet flux communication with magnet 10, and a Darlington transistor pair 14 consisting of transistor switches 16 and 18. Transistor 16 is interconnected with trigger coil 12 so that the trigger coil controls the switching of Darlington transistor 16, which in turn controls the switching of transistor 18.

Instead of magnet 10 and trigger coil 12, the power source for the inductive ignition circuit could be a magnet passing primary winding 20, or a battery.

Referring again to FIG. 1(a), Darlington transistor 14 is also interconnected with a primary winding 20, the latter being in magnet flux communication with a secondary winding 22. Connected across secondary winding 22 is an ignition device such as a spark plug 24.

In FIG. 1(b), a microprocessor 30 has its pin 28 connected to a 5 volt DC source such as a battery or a regulated alternator output, and its pin 10 connected to an input or sensing circuit 32. The sensing circuit includes a line 34 having one end connected to trigger coil 12 and its opposite end connected to the gate of transistor switch 36. Sensing circuit 32 also includes a resistor 38. Switch 36 is connected to pin 10 of microprocessor 30.

Microprocessor 30 also includes an output pin 9, which is connected via line 40 to the gate of a thyristor, such as a silicon controlled rectifier (SCR) 42 (FIG. 1(a)).

Pin 11 of processor 30 is connected via line 44 to a second Darlington transistor pair 46, consisting of transistors 48 and 50. Darlington pair 46 is connected to a 5 volt power supply 52, such as a battery or an alternator. Switch 50 is connected by a line 54 to primary winding 20.

The preferred embodiment depicted in FIGS. 1(a) and 1(b) operates in the following manner. When magnet 10 passes trigger coil 12, a positive voltage and then a negative voltage are produced in the trigger winding, when the positive trigger voltage becomes greater than 1.2 volts, the Darlington transistor is turned on. When the trigger voltage then falls below 1.2 volts, Darlington transistor 16 is turned off. When primary winding 20 is turned off its magnet flux field collapses, causing a large negative voltage spike to be generated by secondary winding 22 across ignition device 24.

The voltage signal from trigger coil 12 is also used to turn on normally off transistor switch 36. When transistor switch 36 is off, pin 10 of microprocessor 30 is kept in its high state. However, when switch 36 is turned on by the trigger coil output signal, pin 10 goes to its low state. When switch 36 is turned off due to a lack of a trigger voltage, processor pin 10 goes to a high state signaling to microprocessor 30 that an ignition firing occurred.

Figure 5:
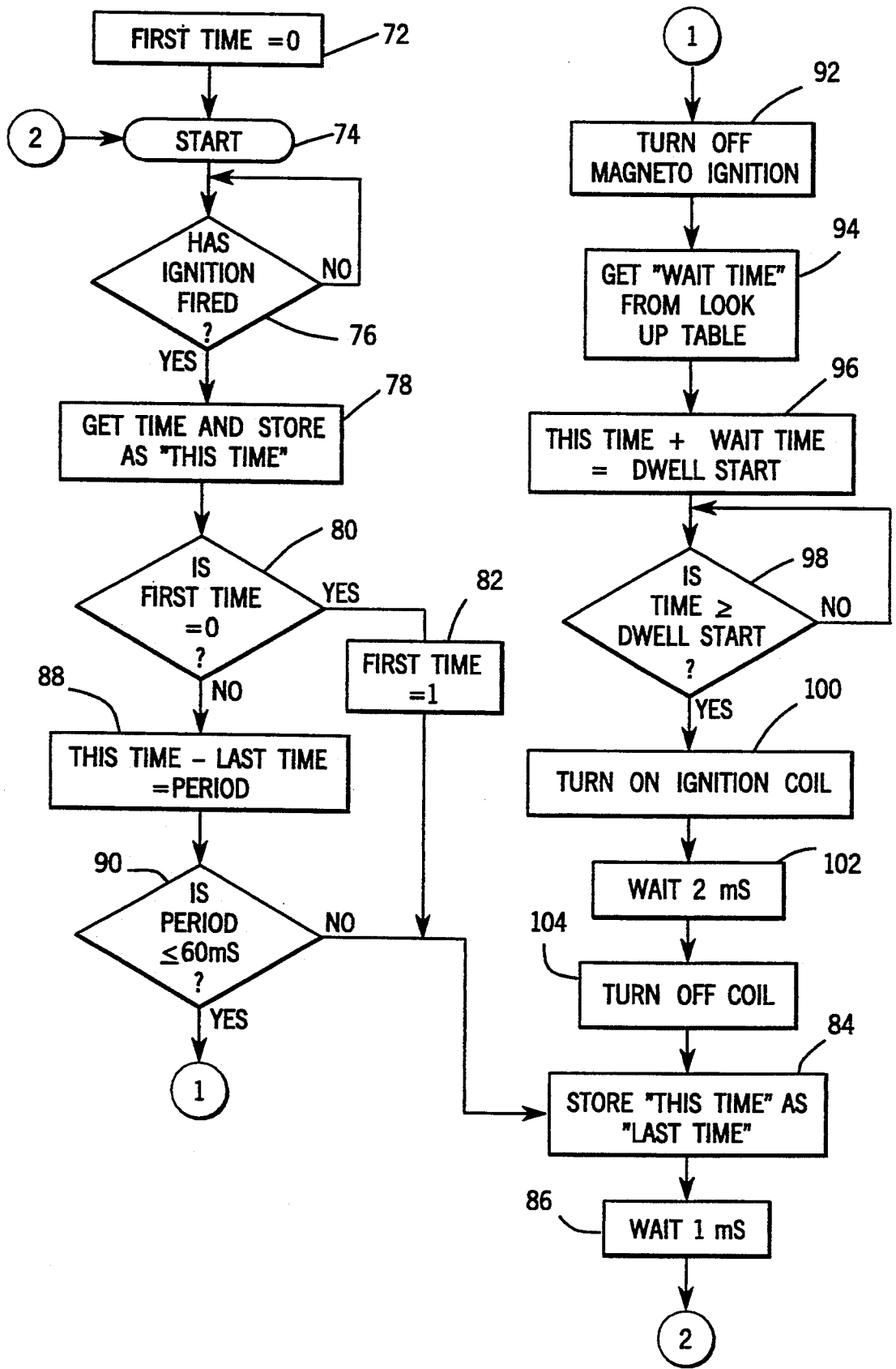
FIG. 5 is a flow chart of the software used in programming the microprocessor in FIGS. 1(a) through (b) and in FIGS. 3(a) through 3(b).

As more fully discussed below in connection with FIG. 5, microprocessor 30 notes the time of the ignition event and compares the time between ignition events with a predetermined time corresponding to a predetermined cutoff speed, such as 1,000 rpm. When the elapsed time between the two ignition events is less than the predetermined time, microprocessor 30 outputs a signal on line 40 to gate on SCR 42, thereby limiting the switch control signals output by trigger coil 12 to 0.9 volts. The limiting of these signals to 0.9 volts shuts off the inductive ignition circuit, but still allows transistor 36 to be turned on and off, thus giving speed indication to processor 30.

Microprocessor 30 then outputs a signal on line 44 which gates on Darlington transistor pair 46. When Darlington transistor 46 is switched on, power from power source 52 is applied via line 54 to primary winding 20. After a preset dwell time, microprocessor 30 ceases the output of the control signal on line 44, thereby shutting off Darlington pair 46. Power from power source 52 is then terminated, causing primary winding 20 to be turned off. The turning off of primary winding 20 causes its magnetic flux field to collapse, resulting in a large voltage spike being generated by secondary coil 22 across spark plug 24.

The point at which the control signal is generated by microprocessor 30 on line 44 to turn on Darlington transistor 46 is determined by the magnitude of the current engine speed. Microprocessor 30 has a look-up table of stored optimal ignition advance values corresponding to a plurality of engine speeds. The point at which the primary winding is turned on by microprocessor 30 is determined by the optimal stored advance value corresponding to the engine speed. Of course, the input from other sensors may be used to determine the amount of ignition advance, such as load and temperature sensors.

The preferred embodiment depicted and described in connection with FIGS. 1(a) through 1(b) allows a magneto inductive ignition circuit having a substantially fixed timing to start the engine and to charge the battery until a predetermined speed has been reached. At this predetermined speed, the inductive ignition circuit is turned off, and the microprocessor thereafter controls ignition timing. The microprocessor may be programmed to enable any selected degrees of ignition advance to occur, depending upon engine operating conditions. In the event that the battery or microprocessor should fail, the inductive ignition circuit would still enable the engine to be started and run.

Figure 2A:
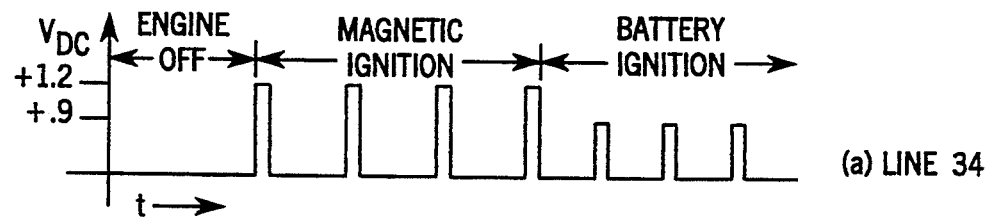
FIGS. 2(a) through 2(d) are timing diagrams relating to signals in FIGS. 1(a) through 1(b).
Figure 2B:
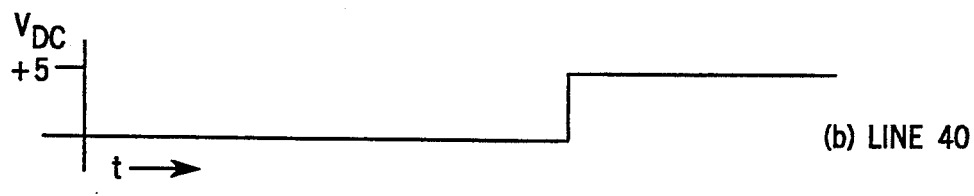
Figure 2C:
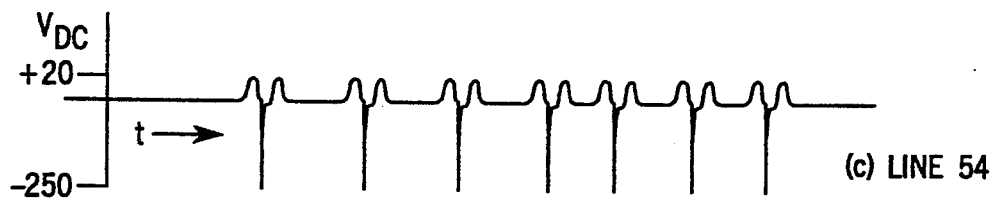
Figure 2D:
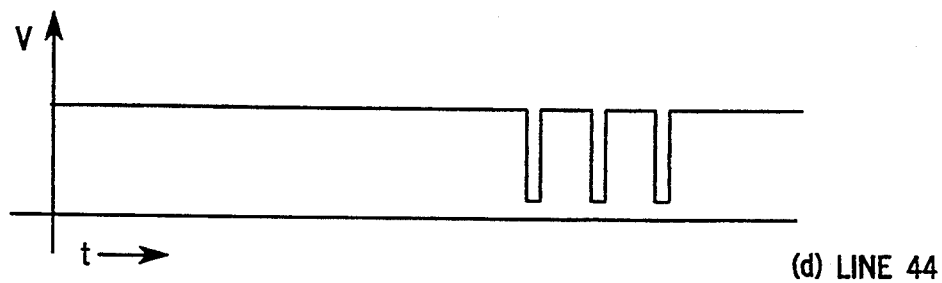

FIGS. 2(a) through 2(d) are timing diagrams relating to the circuit depicted in FIGS. 1(a) and 1(b). FIG. 2(a) is a timing diagram for the signals present on line 34. FIG. 2(b) depicts the signal present on line 40. FIG. 2(c) depicts the signal present on line 54. FIG. 2(d) depicts the signal on line 44.

Figure 3A:
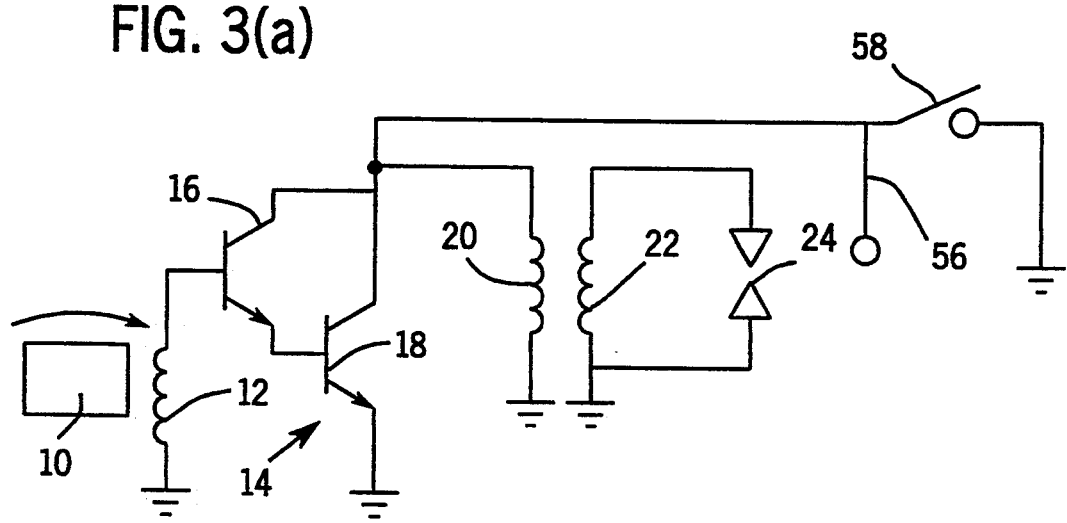
FIGS. 3(a) and 3(b) comprise a circuit diagram for an alternate embodiment of the present invention.
Figure 3B:
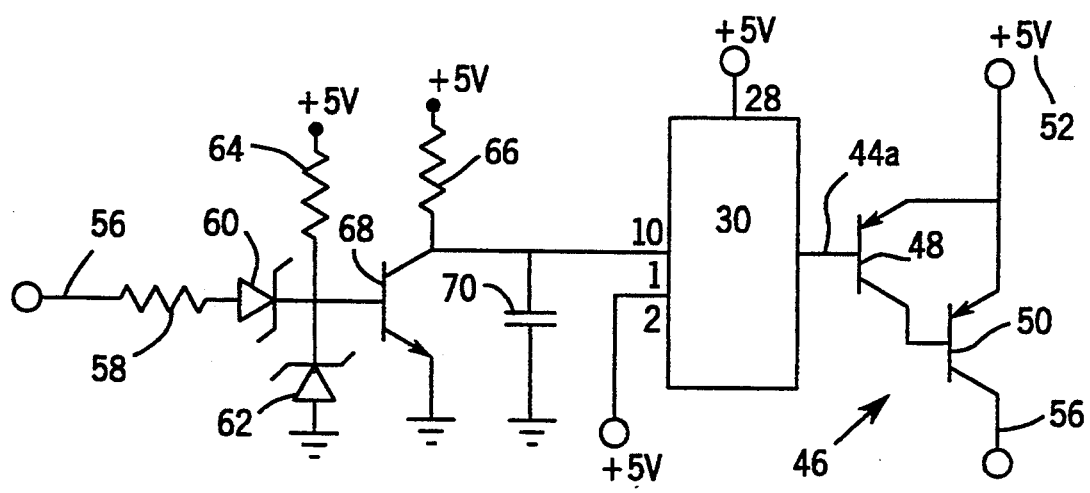

FIGS. 3(a) and 3(b) depict a second embodiment of the present invention. In FIGS. 3(a) and 3(b), components having corresponding functions have been given the same numerical designations. The primary difference between the second embodiment and the first embodiment, depicted in FIG. 1(a) and 1(b), is that the magneto inductive ignition switching signals are not limited in the second embodiment. The inductive ignition circuit continues to fire after the engine has reached the predetermined cut-off speed; however, the fuel mixture has already ignited due to the microprocessor ignition system sparks, so that spark from the magneto ignition system has no effect. Combustion only occurs in response to signals from the microprocessor when the engine speed is above the predetermined cut-off speed.

In the second embodiment depicted in FIGS. 3(a) and 3(b), the same line 56 is used to both conduct signals from power source 52 to primary winding 20 in response to microprocessor control, as well as to carry signals indicative that primary winding 20 has been turned off in response to the induction ignition circuit. To minimize the likelihood of interference between the bidirectional signals on line 56, the firing of the ignition by the inductive ignition circuit must be at least 20 degrees away from the firing by the microprocessor-controlled ignition circuit.

Referring specifically to FIGS. 3(a) and 3(b), the inductive ignition circuit operates in a similar manner to that described above in connection with FIG. 1(b). However, voltage signals from trigger coil 12 are not limited at engine speeds above the predetermined speed. Also note that FIG. 3(a) depicts an optional stop switch 58, which may be a dead man control switch on a lawnmower handle, for example.

As in the first embodiment, magnet 10 and trigger winding 12 could be replaced by another power source, such as a magnet passing primary winding 20 or a battery.

FIG. 3(b) depicts a somewhat different sensing circuit from that depicted in FIG. 1(b). In FIG. 3(b), the sensing circuit includes a resistor 58, zener diodes 60 and 62, resistors 64 and 66, transistor switch 68, and a capacitor 70.

Transistor 68 is normally kept on between ignition firings. When the primary current goes negative, a signal present on line 56 passes through resistor 58 and zener diode 60 to turn off transistor 68. When transistor 68 is turned off, +5 volts is applied to pin 10 of microprocessor 30, indicating to the microprocessor that the ignition has fired. The time of the ignition firing is noted by microprocessor 30, and microprocessor 30 waits until another ignition firing occurs.

When microprocessor 30 determines that the elapsed time between successive ignition firings is less than the predetermined reference time, microprocessor 30 outputs a control signal on line 44(a) to turn on Darlington pair 46. Current is then switched from current source 52 through line 56 to primary winding 20. After an appropriate dwell time, the control signal on line 44(a) is terminated, causing Darlington pair 46 to be turned off, and the magnetic flux field in primary winding 20 to collapse. A highly negative voltage spike is then induced in secondary winding 22 across spark plug 24.

Figure 4A:
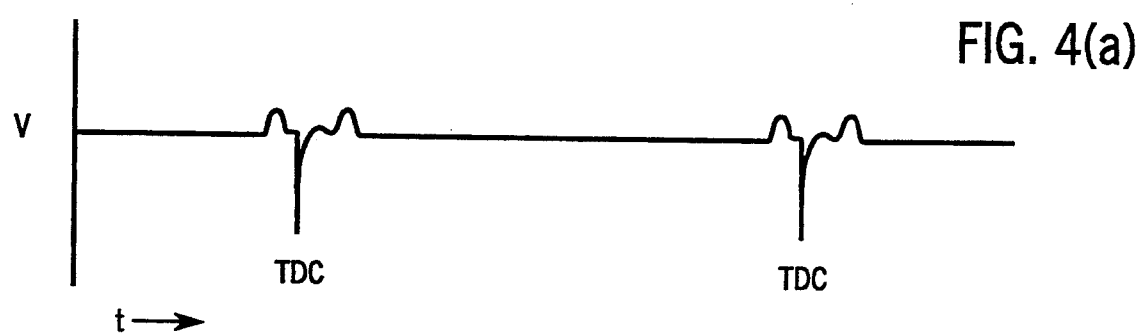
FIGS. 4(a) and 4(b) are timing diagrams relating to the circuit in FIG. 3(a) and 3(b).
Figure 4B:
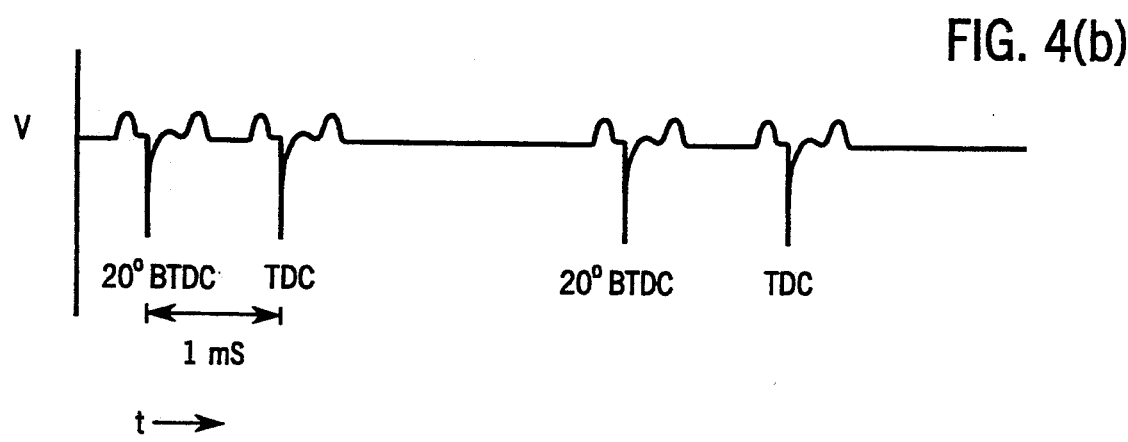

FIGS. 4(a) and 4(b) are timing diagrams relating to the second embodiment depicted in FIGS. 3(a) and 3(b). FIG. 4(a) depicts the firing of the inductive ignition circuit at the top dead center (TDC) position. FIG. 4(b) depicts the firing of the microprocessor-controlled ignition circuit at engine speeds above 1,000 rpm at 20 degrees BTDC. Thereafter, a one millisecond wait time—corresponding to at least 20 degrees—elapses before the inductive ignition circuit fires at TDC.

Microprocessor 30 must, of course, be programmed with appropriate instructions to achieve proper control over the ignition timing. The flow chart diagram of the software program for microprocessor 30 is depicted in FIG. 5. In FIG. 5, a variable called FIRST TIME is initialized at Step 72. The program is then started at Step 74. At Step 76, a determination is made whether an ignition firing has been sensed. If no ignition firing has occurred, the program loops back until an ignition firing is sensed at Step 76.

Once an ignition firing is sensed at Step 76, the time at which the firing occurred is obtained and stored as the variable THIS TIME, at Step 78. Then, a determination is made at Step 80 whether FIRST TIME is equal to zero. If FIRST TIME is equal to zero, then no prior ignition firing has been noted. FIRST TIME is incremented to one at Step 82, and the program proceeds to Step 84. In Step 84, the value of THIS TIME is stored in a register corresponding to a variable called LAST TIME. If the embodiment depicted in FIGS. 3(a) and 3(b) is being used, the program waits one millisecond in Step 86 to prevent interference on line 56, as discussed above. The program then loops back to the Start Step 74.

If FIRST TIME is not equal to zero at Step 80, the time of a prior ignition event must already be stored as LAST TIME. At Step 88, the period, or elapsed time between successive ignition firings is determined by subtracting the value in the LAST TIME register from the value in the THIS TIME register. A determination is then made at Step 90 whether the period or elapsed time is less than 60 milliseconds. 60 milliseconds is a stored reference or predetermined time that corresponds to the predetermined cutoff speed of 1,000 rpm.

If the period is not less than 60 milliseconds, the engine speed is under 1,000 rpm. In that event, the program proceeds to Step 84. At Step 84, the value in the THIS TIME register is moved to the LAST TIME register, a 1 millisecond delay is achieved at Step 86 if the second embodiment of the invention is used, and the program then loops back to Start, Step 74.

If the period is greater than or equal to 60 milliseconds at Step 90, the program proceeds to Step 92 if the first embodiment (FIGS. 1(a) and 1(b)) of the invention is being used. Otherwise, the program proceed to Step 94. At Step 92, the inductive ignition circuit is turned off by outputting a signal on line 40 to gate on SCR 42 (FIGS. 1(a) and 1(b)).

At Step 94, the stored look-up table is accessed and a value called WAIT TIME is obtained. The stored look-up table contains values functionally related to the desired ignition timing advance corresponding to the current engine speed.

At Step 96, the value in the THIS TIME register is added to the value in the WAIT TIME register to equal the value DWELL START. The DWELL START value corresponds to the value of the microprocessor timer when the primary current is to be turned on.

A determination is then made at Step 98 whether the present time is greater than or equal to the DWELL START time. If the answer at Step 98 is NO, the program loops back until the present time is greater than or equal to the time at which the primary current is to be turned ON.

Once the answer at Step 98 becomes YES, the primary winding is turned on at Step 100. The primary current is kept on for a 2 millisecond period at Step 102, corresponding to the dwell time. The primary current is then turned off at Step 104, resulting in a highly negative voltage spike being generated by the secondary coil across the ignition device. The present value of THIS TIME is then moved to the LAST TIME register, a 1 millisecond delay is interposed at Step 86 if the embodiment of FIGS. 3(a) through 3(b) is used, and the program then returns to Start.

Although various types of processors may be used for microprocessor 30, it has been found that one suitable processor is an 8-bit processor available from Motorola, part number MC68HC05P7, operating at a clock speed of 2 Mhz.

While several embodiments of the present invention have been shown and described, other embodiments will be apparent to those skilled in the art and are within the intended scope of the present invention. Therefore, the invention has to be limited only by the following claims.

I claim:

1. An ignition system for an internal combustion engine, comprising:
    a primary winding;
    a secondary winding in magnetic flux communication with said primary winding and interconnected with an ignition device;
    an inductive ignition circuit for operating said engine below a predetermined speed, including:
        first means for generating a changing magnetic field and for generating a first switch control signal;
        first switch means, interconnected with said primary winding for switching said primary winding on or off in response to said first switch control signal;
    a processor-controlled ignition circuit for operating said engine above said predetermined speed, including:
        means for sensing a first event functionally related to a first turn off time of said primary winding, and for sensing a second event functionally related to a second turn off time of said primary winding;
        means for determining the elapsed time between said first event and said second event;
        means for comparing said elapsed time with a predetermined time that is functionally related to said predetermined speed; and
        means for causing said primary winding to be turned on if said elapsed time is less than said predetermined time, and for thereafter causing said primary winding to be turned off.

2. The ignition system of claim 1, further comprising:
    means for preventing said primary winding from being turned on or off in response to said first switch control signal when said elapsed time is less than said predetermined time.

3. The ignition system of claim 2, wherein said preventing means includes a silicon controlled rectifier that is gated on when said elapsed time is less than said predetermined time.

4. The ignition system of claim 1, wherein said processor-controlled ignition circuit further comprises:
    means for storing a desired ignition advance value that is functionally related to said elapsed time; and
    means for changing the time at which said causing means turns said primary winding on as a function of said desired advance value.

5. The ignition system of claim 1, further comprising:
    second switch means, responsive to said causing means, for turning on said primary winding if said elapsed time is less than said predetermined time.

6. The ignition system of claim 5, wherein said second switch means includes a Darlington transistor.

7. The ignition system claim 1, wherein said first switch means includes a Darlington transistor.

8. The ignition system of claim 2, wherein said determining means, said comparing means, and said causing means all include a microprocessor.

9. The ignition system of claim 1, wherein said predetermined speed is about 1,000 revolutions per minute.

10. The ignition system of claim 1, wherein said inductive ignition circuit achieves a substantially fixed ignition timing advance at speeds below said predetermined speed, and wherein said processor-controlled circuit achieves a variable ignition timing advance at speeds above said predetermined speed.

11. The ignition system of claim 1, further comprising:
    a voltage source, interconnected with said causing means, that provides power to said primary winding when said primary winding is turned on in response to said causing means.

12. The ignition system of claim 11, wherein said voltage source is a battery.

13. The ignition system of claim 1, where in said first event and said second event include the generating of said first switch control signal.

14. The ignition system of claim 1, wherein said inductive ignition circuit includes a magneto-type ignition system.

15. The ignition system of claim 1, further comprises:
    a first power source that powers said inductive ignition circuit; and
    a second power source, distinct from said first power source, that powers said processor-controlled ignition circuit.

16. The ignition system of claim 15, wherein
    said first power source includes either a magnet that interacts with said primary winding, or a battery, or an alternator, or a trigger winding; and wherein said second power source includes either a battery or an alternator.

* * * * *